(12) United States Patent
Na et al.

(10) Patent No.: US 8,873,452 B2
(45) Date of Patent: Oct. 28, 2014

(54) MULTIMEDIA MULTICAST/BROADCAST SERVICE PROVIDING APPARATUS AND MULTIMEDIA MULTICAST/BROADCAST SERVICE PROVIDING METHOD USING THE SAME

(71) Applicant: Electronics & Telecommunications Research Institute, Daejeon (KR)

(72) Inventors: Jee Hyeon Na, Daejeon (KR); Jung Mo Moon, Daejeon (KR); Dae Ik Kim, Daejeon (KR); Yeon Seung Shin, Daejeon (KR); Woo Goo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 131 days.

(21) Appl. No.: 13/715,303

(22) Filed: Dec. 14, 2012

(65) Prior Publication Data
US 2013/0163500 A1 Jun. 27, 2013

(30) Foreign Application Priority Data
Dec. 27, 2011 (KR) .......................... 10-2011-0142906

(51) Int. Cl.
*H04H 20/71* (2008.01)
*H04W 72/00* (2009.01)

(52) U.S. Cl.
CPC .................................. *H04W 72/005* (2013.01)
USPC ........................................... 370/312; 370/432

(58) Field of Classification Search
None
See application file for complete search history.

(56) References Cited

U.S. PATENT DOCUMENTS

| 8,135,419 B2* | 3/2012 | Wang et al. ................... 455/458 |
| 8,249,007 B2* | 8/2012 | Jading et al. .................. 370/329 |
| 8,625,606 B2* | 1/2014 | Drevo ....................... 370/395.43 |
| 2005/0043050 A1 | 2/2005 | Lee et al. |
| 2005/0074024 A1 | 4/2005 | Kim et al. |
| 2005/0249141 A1* | 11/2005 | Lee et al. ..................... 370/312 |
| 2009/0257390 A1* | 10/2009 | Ji et al. ......................... 370/329 |
| 2010/0008280 A1 | 1/2010 | Ornbo et al. |
| 2010/0157919 A1* | 6/2010 | Koskinen ..................... 370/329 |
| 2010/0263012 A1* | 10/2010 | Huang et al. .................. 725/116 |

(Continued)

FOREIGN PATENT DOCUMENTS

| KR | 1020050019028 | 2/2005 |
| KR | 1020050019560 | 3/2005 |
| KR | 1020110026504 | 3/2011 |
| WO | 2008/024214 A2 | 2/2008 |

*Primary Examiner* — Anh-Vu Ly
(74) *Attorney, Agent, or Firm* — Nelson Mullins Riley & Scarborough LLP

(57) ABSTRACT

An MBMS providing apparatus and an MBMS providing method using the same in a cloud radio access network are provided. The MBMS providing apparatus includes a third layer into which a plurality of network layers providing an MBMS are integrated in the plurality of DUs, and a second layer into which a plurality of datalink layers providing the MBMS are integrated in the DUs. Therefore, the present invention integrates the layers that provide the MBMS in the plurality of DUs, and provide the MBMS by MBSFN synchronization area through the integrated layers. Accordingly, by performing the MBMS by MBSFN synchronization area through respective integrated layers, the present invention can prevent the occurrence of an unnecessary load, thus enhancing the performance of a communication network.

12 Claims, 4 Drawing Sheets

(56) References Cited

U.S. PATENT DOCUMENTS

| | | | |
|---|---|---|---|
| 2010/0272004 A1* | 10/2010 | Maeda et al. | 370/312 |
| 2012/0093060 A1* | 4/2012 | Huschke et al. | 370/312 |
| 2012/0163273 A1* | 6/2012 | Na et al. | 370/312 |
| 2012/0170501 A1* | 7/2012 | Drozt et al. | 370/312 |
| 2012/0170502 A1* | 7/2012 | Korus et al. | 370/312 |
| 2013/0044668 A1* | 2/2013 | Purnadi et al. | 370/312 |
| 2013/0121226 A1* | 5/2013 | Anchan et al. | 370/311 |

* cited by examiner

MULTIMEDIA MULTICAST/BROADCAST SERVICE PROVIDING APPARATUS AND MULTIMEDIA MULTICAST/BROADCAST SERVICE PROVIDING METHOD USING THE SAME

CLAIM FOR PRIORITY

This application claims priority to Korean Patent Application No. 10-2011-0142906 filed on Dec. 27, 2011 in the Korean Intellectual Property Office (KIPO), the entire contents of which are hereby incorporated by reference.

BACKGROUND

1. Technical Field

Example embodiments of the present invention relate in general to a multimedia broadcast/multicast service (MBMS) providing apparatus and an MBMS providing method using the same and more specifically to an MBMS providing apparatus and an MBMS providing method using the same in a cloud radio access network.

2. Related Art

A cloud radio access network is a network in which a conventional integrated base station is divided into a plurality of digital units (DUs) and a remote radio head (RRH), the DUs for processing signals are centralized in a DU center (or base station), and at least one RRH is connected to the DU center.

The MBMS is provided over the cloud radio access network, in which case respective DUs included in the DU center separately process control information and broadcast information on the MBMS and thus provide the broadcast information to a corresponding RRH.

In this case, when the DUs process different broadcast information, no drawback occurs, but when the DUs process the same broadcast information, load applied to the DU center increases because an operation of processing control information and broadcast information is redundantly performed, causing a decrease in the performance of the cloud radio access network.

SUMMARY

Accordingly, example embodiments of the present invention are provided to substantially obviate one or more problems due to limitations and disadvantages of the related art.

Example embodiments of the present invention provide an MBMS providing apparatus for integratedly processing control information and broadcast information on the MBMS.

Example embodiments of the present invention also provide an MBMS providing a method for integratedly processing control information and broadcast information on the MBMS.

In some example embodiments, a multimedia multicast and broadcast service (MBMS) providing apparatus, including a plurality of digital units (DUs) that manage a plurality of cells included in a multimedia broadcast single frequency network (MBSFN) synchronization area, includes: a third layer into which a plurality of network layers providing an MBMS are integrated in the plurality of DUs; and a second layer into which a plurality of datalink layers providing the MBMS are integrated in the DUs.

The third layer may include: a control layer configured to process control information for the MBMS; and a data layer configured to process broadcast information for the MBMS.

The MBMS providing apparatus may further include a first layer configured to integrate a plurality of physical layers providing the MBMS in the DUs.

The MBMS providing apparatus may set a control parameter for providing the MBMS to the cells included in the MBSFN synchronization area on the basis of one piece of M2 application protocol (M2AP) information, the M2 denoting a control plane interface inside a radio access network.

The M2AP information may include at least one of one piece of MBMS session information, one piece of MBMS scheduling information, one piece of reset information, one piece of M2 setup information, one piece of base station setup update information, one piece of multicell and multicast coordination entity (MCE) setup update information, one piece of error indication information, one piece of MBMS session update information, and one piece of MBMS counting information that are used to provide the MBMS to the cells included in the MBSFN synchronization area.

The MBMS providing apparatus may provide one piece of broadcast information to the cells included in the MBSFN synchronization area.

In other example embodiments, A multicell and multicast coordination entity (MCE) for providing a multimedia multicast and broadcast service (MBMS) includes: a generator configured to generate one piece of M2 application protocol (M2AP) information for an MBMS layer, into which a plurality of layers providing the MBMS are integrated, in a plurality of digital units (DUs) that manage a plurality of cells included in a multimedia broadcast single frequency network (MBSFN) synchronization area, the M2 denoting a control plane interface inside a radio access network; and a provider configured to provide the one piece of M2AP information to an MBMS providing apparatus.

The M2AP information may include at least one of one piece of MBMS session information, one piece of MBMS scheduling information, one piece of reset information, one piece of M2 setup information, one piece of base station setup update information, one piece of multicell and multicast coordination entity (MCE) setup update information, one piece of error indication information, one piece of MBMS session update information, and one piece of MBMS counting information that are used to provide the MBMS to the cells included in the MBSFN synchronization area.

In still other example embodiments, a multimedia multicast and broadcast service (MBMS) providing method in an MBMS providing apparatus, including a plurality of digital units (DUs) that manage a plurality of cells included in a multimedia broadcast single frequency network (MBSFN) synchronization area, includes: setting a control parameter for providing the MBMS on the basis of one piece of M2 application protocol (M2AP) information for an MBMS layer into which a plurality of layers providing the MBMS are integrated in the DUs, the M2 denoting a control plane interface inside a radio access network; and providing one piece of broadcast information to the cells included in the MBSFN synchronization area through the MBMS layer.

The setting of a control parameter may include: initializing information of the MBMS layer; providing one piece of M2 setup request information for the MBMS layer to a multicell and multicast coordination entity (MCE); setting an M2 interface according to the one piece of M2 setup request information, and setting a channel for the MBMS layer and the MCE on the basis of one piece of MCE setup update information; providing one piece of MCE setup update check information that is a response to the one piece of MCE setup update information; setting a plurality of layers for providing the MBMS; providing one piece of MBMS session response information to the MCE according to one piece of MBMS session start request information; and setting a session for providing broadcast information on the basis of the one piece of MBMS session start request information.

In still other example embodiments, a multimedia multicast and broadcast service (MBMS) providing method in a multicell and multicast coordination entity (MCE) includes: providing one piece of M2 setup information for an MBMS layer, into which a plurality of layers providing the MBMS are integrated in a plurality of digital units (DUs) that manage a plurality of cells included in a multimedia broadcast single frequency network (MBSFN) synchronization area, to an MBMS providing apparatus, the M2 denoting a control plane interface inside a radio access network; providing one piece of MCE setup update information for the MBMS layer to the MBMS providing apparatus; and providing one piece of MBMS session start information for the MBMS layer to the MBMS providing apparatus.

In still other example embodiments, a multimedia multicast and broadcast service (MBMS) providing method in a communication network, which includes; an MBMS providing apparatus including a plurality of digital units (DUs) that manage a plurality of cells included in a multimedia broadcast single frequency network (MBSFN) synchronization area; a multicell and multicast coordination entity (MCE); and a MBMS gateway (MBMS-GW), includes: initializing, by the MBMS providing apparatus, information for an MBMS layer into which a plurality of layers providing the MBMS are integrated in the DUs; providing, by the MBMS providing apparatus, one piece of M2 setup request information for the MBMS layer to the MCE, the M2 denoting a control plane interface inside a radio access network; and providing, by the MCE, one piece of M2 setup response information to the MBMS providing apparatus, the M2 setup response information being a response to the one piece of M2 setup request information.

The MBMS providing method may further include: setting an M2 interface according to the one piece of M2 setup response information, and providing, by the MCE, one piece of MCE setup update information for the MBMS layer to the MBMS providing apparatus; setting, by the MBMS providing apparatus, a channel for the MBMS layer and the MCE on the basis of the one piece of MCE setup update information; providing, by the MBMS providing apparatus, one piece of MCE setup update check information to the MCE, the MCE setup update check information being a response to the one piece of MCE setup update information; and setting, by the MBMS providing apparatus, an MBMS layer for providing the MBMS.

The MBMS providing method may further include: providing, by the MCE, one piece of MBMS session start request information for the MBMS layer to the MBMS providing apparatus after the MBMS layer for providing the MBMS is set; providing, by the MBMS providing apparatus, one piece of MBMS session start response information to the MCE, the MBMS session start response information being a response to the one piece of MBMS session start request information; and setting, by the MBMS providing apparatus, a session for providing broadcast information on the basis of the MBMS session start request information.

The MBMS providing method may further include: providing, by the MBMS-GW, one piece of broadcast information for the MBMS layer to the MBMS providing apparatus after the session for providing the broadcast information is set; and providing, by the MBMS providing apparatus, the one piece of broadcast information to the cells, included in the MBSFN synchronization area, through the MBMS layer.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
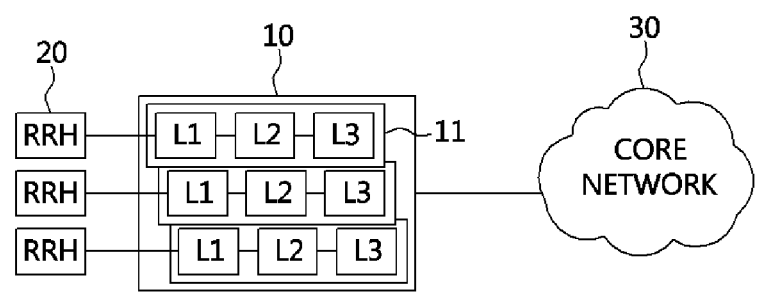
FIG. 1 is a block diagram illustrating a cloud radio access network.

The invention may have diverse modified embodiments, and thus, example embodiments are illustrated in the drawings and are described in the detailed description of the invention.

However, this does not limit the invention within specific embodiments and it should be understood that the invention covers all the modifications, equivalents, and replacements within the idea and technical scope of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the invention will be described in detail with reference to the accompanying drawings. In describing the invention, to facilitate the entire understanding of the invention, like numbers refer to like elements throughout the description of the figures, and a repetitive description on the same element is not provided.

FIG. 1 is a block diagram illustrating a cloud radio access network.

Referring to FIG. 1, the cloud radio access network includes an RRH 20, an MBMS providing apparatus (or DU center) 10 that integratedly manages a plurality of DUs 11, and a core network 30. A plurality of RRHs 20 may be connected to the MBMS providing apparatus 10, and one DU 11 included in the MBMS providing apparatus 10 may be connected to one RRH 20. In this case, the MBMS providing apparatus 10 and the RRH 20 may be connected through an optical cable. Also, the cloud radio access network may provide the MBMS, and provide a multimedia broadcast single frequency network (MBSFN).

In the specification, for example, the cloud radio access network may include a 2G mobile communication network such as global system for mobile communication (GSM), code division multiple access (CDMA), wireless Internet such as a Long Term Evolution (LTE) network, LTE-Advanced network, and wireless fidelity (WiFi), portable Internet such as wireless broadband Internet (WiBro) and world interoperability for microwave access (WiMax), or a mobile communication network (for example, a 3G mobile communication network such as wideband code division multiple access (WCDMA) or CDMA2000, a 3.5G mobile communication network such as high speed downlink packet access (HSDPA) or high speed uplink packet access (HSUPA), or a 4G mobile communication network) that supports packet transmission.

In the specification, an MBMS providing apparatus (base station (BS)) may denote an access point (AP), a radio access station (RAS), an evolved nodeB (eNodeB), a base transceiver station (BTS), or a mobile multihop relay (MMR)-BS, and include all or some functions of the AP, RAS, eNodeB, BTS, and MMR-BS.

One MBMS providing apparatus 10 may include a DU 11 that provides LTE or LTE-advanced, a DU 11 that provides WiMax, and a DU 11 that provides ultra mobile broadband (UMB). Here, the DU 11 that provides LTE or LTE-advanced may be connected to an RRH 20 that provides LTE or LTE-advanced and a core network 30. The DU 11 that provides WiMax may be connected to an RRH 20 that provides WiMax and the core network 30. The DU 11 that provides UMB may be connected to an RRH 20 that provides UMB and the core network 30.

In the specification, an MBFSN synchronization area is an area that enables synchronized transmission for a multi-cell transmission service, and a plurality of cells in the MBFSN synchronization area enable synchronized transmission, and remove interference between cells through synchronized transmission and thus obtain a diversity gain. One of the cells may be in one MBFSN synchronization area. The MBFSN synchronization area may include 256 or fewer MBSFN areas. For MBSFN transmission, the same radio resource area for MBSFN may be allocated to a plurality of cells included in the MBSFN area, and the cells may have the same broadcast channel information. One MBSFN area may have sixteen or fewer multicast channels (MCHs) that are transmitted by the same coding scheme in a wireless section. One MCH may have a service that transfers 29 or fewer broadcast contents.

Figure 2:
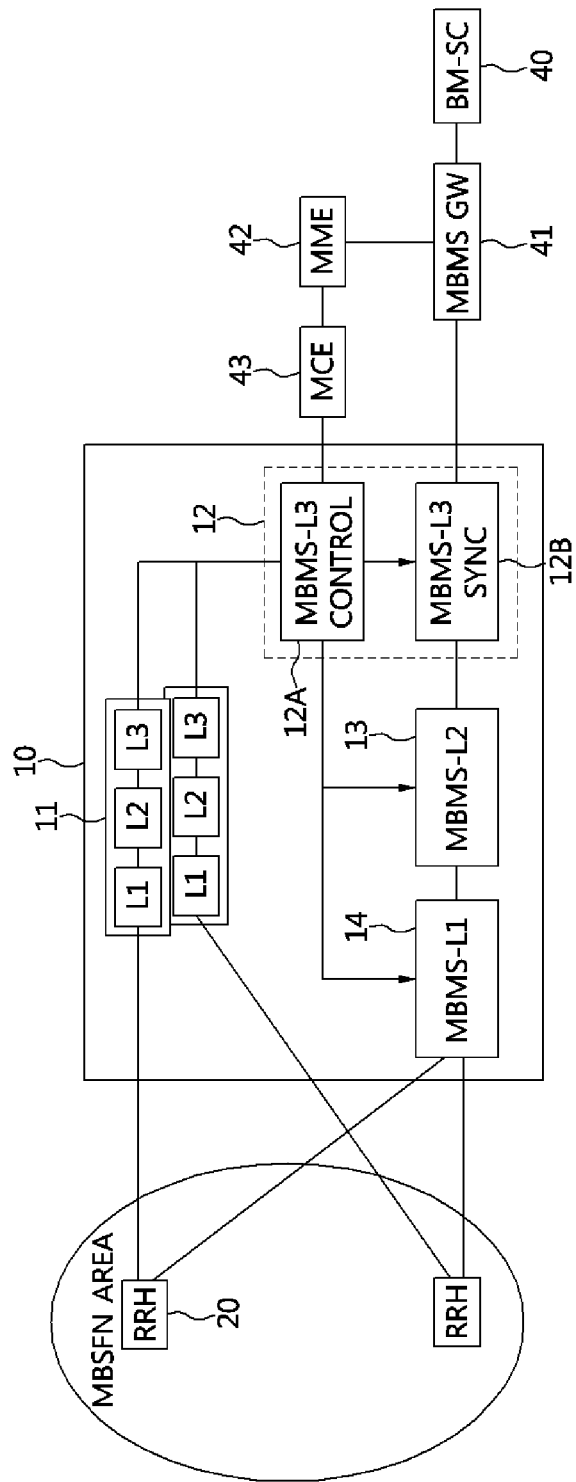
FIG. 2 is a block diagram illustrating a cloud radio access network according to an embodiment of the present invention.
Figure 3:
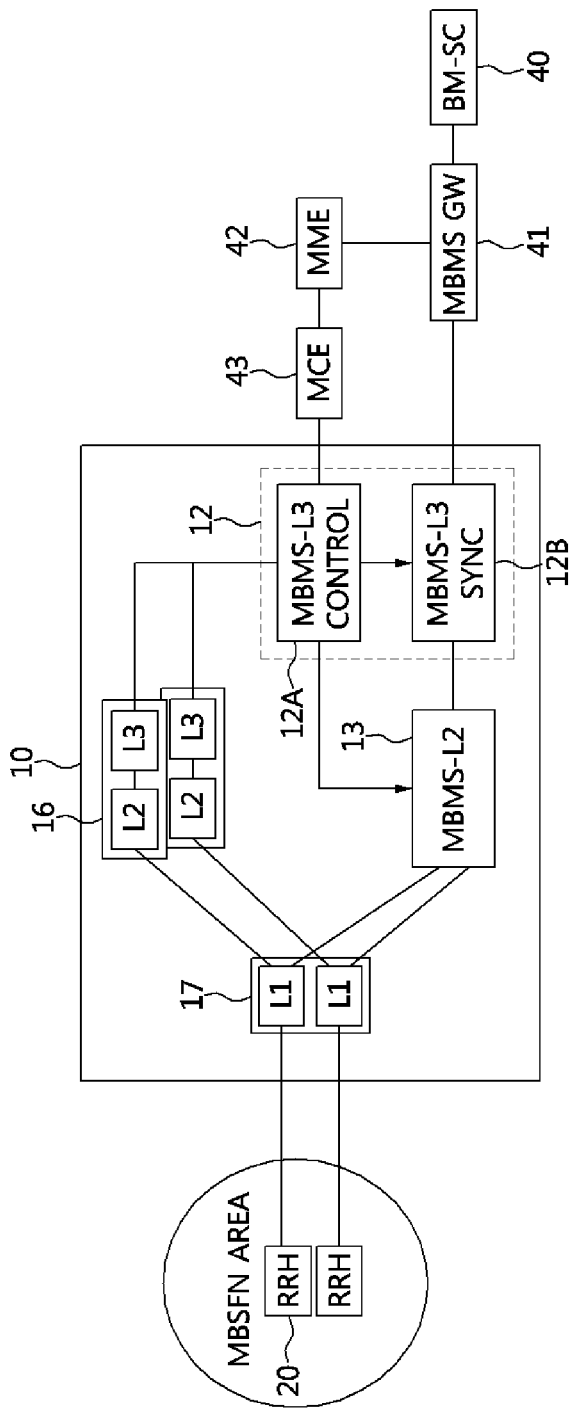
FIG. 3 is a block diagram illustrating a cloud radio access network according to another embodiment of the present invention.

FIG. 2 is a block diagram illustrating a cloud radio access network according to an embodiment of the present invention. FIG. 3 is a block diagram illustrating a cloud radio access network according to another embodiment of the present invention.

Referring to FIGS. 2 and 3, the cloud radio access network may include an RRH 20, an MBMS providing apparatus 10 connected to a plurality of RRHs 20, a broadcast-multicast service center (BM-SC) 40 that is connected to the MBMS providing apparatus 10 and provides the MBMS, an MBMS-gateway (GW) 41, a mobility management entity (MME) 42, and a multicell/multicast coordination entity (MCE) 43.

The BM-SC 40 performs authority verification and service start on MBMS bearer services, and manages scheduling and transmission in consideration of service quality on MBMS contents. The BM-SC 40 may transfer self-broadcast information (contents) to the LTE network or the LTE-advanced network, and relay broadcast information in operational connection with an external content server. The BM-SC 40 includes an SGmb interface for exchanging control information (message) with the MBMS-GW 41, and an SGi-mb interface for transmitting broadcast information. The MBMS-GW 41 may perform a control (service start/end) on an MBMS session, and transfer broadcast information to a plurality of the MBMS providing apparatuses 10 in an Internet protocol (IP) multicast transmission scheme. The MBMS-GW 41 includes an Sm interface for exchanging control information on a session with the MME 42, and an M1 interface for transferring broadcast information to the MBMS providing apparatus 10.

The MME 42 controls the MBMS session, and includes an M3 interface for connection with the MCE 43. The MCE 43 manages and allocates radio resources for the MBMS providing apparatuses 10 included in the MCE 43, and controls the granting of the MBMS. The MCE 43 determines modularization and coding levels for MBMS services and controls the MBMS session. The MBMS providing apparatus 10 receives information of radio resources allocated by the MCE 43, allocates actual radio resources to broadcast services scheduled by the MCE 43, and performs synchronized transmission for the MBMS services. The MCE 43 includes an M2 interface for exchanging control information with the MBMS providing apparatus 10. The MCE 43 is a logical node having a radio access function equivalent to that of the MBMS providing apparatus 10, and may be separated from the MBMS providing apparatus 10 to centrally manage radio resources. The MCE 43 may be disposed in each of the MBMS providing apparatuses 10, in which case the MCE 43 of one MBMS providing apparatus 10 is a master and the respective MCEs 43 of the other MBMS providing apparatuses 10 are slaves.

The MBMS providing apparatus 10 integratedly manages the DUs 11 connected to the respective RRHs 20, and provides unicast, multicast, and broadcast services. Unlike conventional technology in which one DU 11 includes both resources for a unicast service and resources for providing multicast/broadcast, the present invention integrally manages resources (which are separated from a connectional DU 11) for multicast/broadcast.

The MBMS providing apparatus 10 may include a third layer 12 into which a plurality of network layers for providing the MBMS in a plurality of DUs are integrated, and a second layer 13 into which a plurality of datalink layers for providing the MBMS in the plurality of DUs are integrated. The MBMS providing apparatus 10 may further include a first layer 14 into which a plurality of physical layers for providing the MBMS in the plurality of DUs are integrated. In this case, when the MBMS providing apparatus 10 includes only the second and third layers 13 and 12, the MBMS providing apparatus 10 may further include a DU 16 into which a layer 2 and layer 3 for providing the unicast service are integrated, and a DU 17 into which a layer 1 for providing the unicast/multicast/broadcast service is integrated.

Here, the third layer (MBMS-L3) 12 may perform a radio resource control (RRC) function and a general packet radio service tunnelling protocol (GTP) function, and the second layer (MBMS-L2) 12 may perform a medium access control (MAC) function, a radio link control (RLC) function, and a packet data convergence protocol (PDCP) function. The first layer (MBMS-L1) 11 may perform a physical layer (PHY) function.

When the MBMS providing apparatus 10 includes the DU 11 for unicast, and the first to third layers 14, 13 and 12 for multicast/broadcast, the DU 11 processes content information and control information for unicast, and the first to third layers 14, 13 and 12 process broadcast information and control information for multicast/broadcast. Here, the broadcast information may be separated for each MBSFN synchronization area in the first layer 14, and provided to the RRHs 20 disposed in each MBSFN synchronization area.

The third layer 12 may include a control layer (MBMS-L3) 12a and a data layer (MBMS-L3 SYNC) 12b, and receive control information from the MCE 43 through the M2 interface to control the MBMS on the basis of the control information. The data layer 12b may receive sync information and broadcast information from the MBMS-GW 41 through the M1 interface, and multicast/broadcast the broadcast information according to the sync information.

That is, the control information is provided from the MCE 43 to the control layer 12a, and the control layer 12a controls the first layer 14, the second layer 13, and the data layer 12b on the basis of the control information. The broadcast information is provided from the MBMS-GW 41 to the data layer 12b, and the data layer 12b allows the broadcast information to be provided to the RRH 20 through the second layer 13 and the first layer 14 according to the sync information.

When the MBMS providing apparatus 10 includes the DU 16 into which the layer 2 and the layer 3 for providing the unicast service are integrated, the DU 17 into which the layer 1 for providing the unicast/multicast/broadcast service is integrated, and the second and third layers 13 and 12 for multicast/broadcast, the DU 16 with the layer 2 and layer 3 integrated therein and the DU 17 with the layer 1 integrated therein process the content information and control information for unicast. The DU 17 with the layer 1 integrated therein and the second and third layers 13 and 12 process the broadcast information and control information for multicast/broadcast. Here, the broadcast information may be separated for each MBSFN synchronization area in the second layer 13, and provided to the DU 17 with the layer 1 integrated therein that manages the RRHs 20 disposed in each MBSFN synchronization area.

The MBMS providing apparatus 10 may receive one piece of M2 application protocol (M2AP) information (where M2 denotes a control plane interface inside a radio access network, which is defined in 3GPP TS36.443) for the first to third layers 14, 13 and 12, which manage a plurality of cells included in the MBSFN synchronization area, from the MCE 43, and set a control parameter for providing the MBMS to the cells included in the MBSFN synchronization area on the basis of the one piece of M2AP information.

The one piece of M2AP information may include at least one of one piece of MBMS session information (MBMS SESSION START/STOP/UPDATE REQUEST), one piece of MBMS scheduling information (MBMS SCHEDULING INFORMATION), one piece of reset information (RESET), one piece of M2 setup information (M2 SETUP RESPONSE/FAILURE), one piece of base station setup update information (eNB CONFIGURATION UPDATE ACKNOWLEDGE/FAILURE) (i.e., MBMS providing apparatus setup update information), one piece of MCE setup update information (MCE CONFIGURATION UPDATE), one piece of error indication information (ERROR INDICATION), one piece of MBMS session update information (MBMS SESSION UPDATE REQUEST), and one piece of MBMS counting information (MBMS SERVICE COUNTING REQUEST).

That is, the MBMS providing apparatus (or third layer 12) 10 may receive one MBMS SESSION START/STOP/UPDATE REQUEST message from the MCE 43, and provide one MBMS SESSION START/STOP/UPDATE RESPONSE message or one MBMS SESSION START/STOP/UPDATE FAILURE message to the MCE 43 in response to the received message.

The MBMS providing apparatus (or third layer 12) 10 may receive one MBMS SCHEDULING INFORMATION message from the MCE 43, and provide one MBMS SCHEDULING INFORMATION RESPONSE message to the MCE 43 in response to the received message.

The MBMS providing apparatus (or third layer 12) 10 may receive one RESET message from the MCE 43, and provide one RESET ACKNOWLEDGE message to the MCE 43 in response to the received message. Also, the MBMS providing apparatus (or third layer 12) 10 may provide one RESET message to the MCE 43, and receive one RESET ACKNOWLEDGE message from the MCE 43 in response to the RESET message.

The MBMS providing apparatus (or third layer 12) 10 may provide one M2 SETUP REQUEST message to the MCE 43, and receive one M2 SETUP RESPONSE/FAILURE message from the MCE 43 in response to the provided message.

The MBMS providing apparatus (or third layer 12) 10 may provide one eNB CONFIGURATION UPDATE message to the MCE 43, and receive one eNB CONFIGURATION UPDATE ACKNOWLEDGE/FAILURE message from the MCE 43 in response to the provided message.

The MBMS providing apparatus (or third layer 12) 10 may receive one MCE CONFIGURATION UPDATE message from the MCE 43, and provide one MCE CONFIGURATION ACKNOWLEDGE/FAILURE message to the MCE 43 in response to the received message.

The MBMS providing apparatus (or third layer 12) 10 may provide one ERROR INDICATION message to the MCE 43, and receive one ERROR INDICATION message from the MCE 43 in response to the provided message.

The MBMS providing apparatus (or third layer 12) 10 may receive one MBMS SESSION UPDATE REQUEST message from the MCE 43, and provide one MBMS SESSION UPDATE RESPONSE/FAILURE message to the MCE 43 in response to the received message.

The MBMS providing apparatus (or third layer 12) 10 may receive one MBMS SERVICE COUNTING REQUEST message from the MCE 43, and provide an MBMS SERVICE COUNTING RESPONSE/FAILURE message and an MBMS SERVICE COUNTING RESULTS REPORT message to the MCE 43 in response to the received message.

In this way, the MBMS providing apparatus 10 may receive the one piece of M2AP information from the MCE 43, and set a control parameter, such as session setup between the MBMS providing apparatus 10 and the MCE 43, channel setup (multicast control channel (MCCH), broadcast control channel (BCCH), etc.) of each layer, and setup of a cell providing the MBMS, for the MBMS on the basis of the received M2AP information.

The MCE 43 providing the MBMS may include a generator (not shown) that generates one piece of M2AP information for an MBMS layer, into which a plurality of layers providing the MBMS are integrated, in the DUs 11 that manage the cells included in the MBSFN synchronization area, and a provider (not shown) that provides one piece of M2AP information to the MBMS providing apparatus 10. Here, the MBMS layer may include the third layer 12 and the second layer 13, and may further include the first layer 14. Also, the third layer 12 may include the control layer 12a and the data layer 12b, and the provider may provide one piece of M2AP information to the control layer 12a.

Moreover, the one piece of M2AP information may include at least one of one piece of MBMS session information (MBMS SESSION START/STOP/UPDATE REQUEST), one piece of MBMS scheduling information (MBMS SCHEDULING INFORMATION), one piece of reset information (RESET), one piece of M2 setup information (M2 SETUP RESPONSE/FAILURE), one piece of base station setup update information (eNB CONFIGURATION UPDATE ACKNOWLEDGE/FAILURE) (i.e., MBMS providing apparatus setup update information), one piece of MCE setup update information (MCE CONFIGURATION UPDATE), one piece of error indication information (ERROR INDICATION), one piece of MBMS session update information (MBMS SESSION UPDATE REQUEST), and one piece of MBMS counting information (MBMS SERVICE COUNTING REQUEST).

The MBMS providing apparatus for the MBMS and the MCE, according to the present invention, have been described above in detail. Hereinafter, an MBMS providing method according to the present invention will be described in detail.

Figure 4:
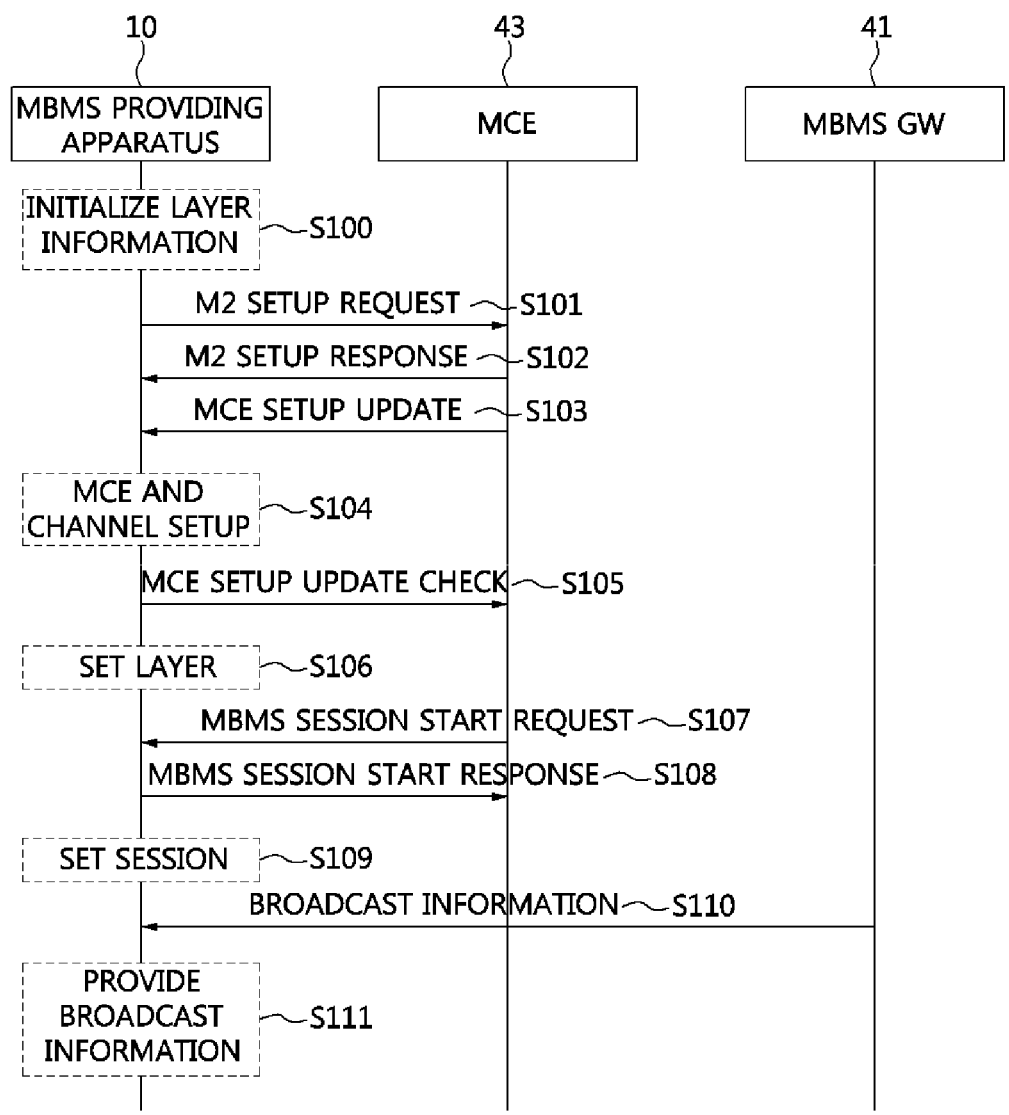
FIG. 4 is a flowchart illustrating an MBMS providing method according to an embodiment of the present invention.

FIG. 4 is a flowchart illustrating an MBMS providing method according to an embodiment of the present invention.

Referring to FIG. 4, the MBMS providing method may include operation S100 for initializing information of layers providing the MBMS, operations S101 and S102 for setting the M2 interface, operations S103 to S106 for setting the MCE, the channels, and the layers, operations S107 to S109 for setting the MBMS session, and operations S110 and S111 for providing the broadcast information. Here, each of the layers is a layer providing the MBMS, and may denote the first to third layers 14, 13 and 12 of FIG. 2 or denote the second and third layers 13 and 12 of FIG. 3. Also, the third layer 12 may include the control layer 12a and the data layer 12b.

Operation S100 is an operation of initializing the information of the layers providing the MBMS, and initializing information of each layer that manages a plurality of cells included in the same MBSFN synchronization area. That is, control parameter information that has been previously set may be initialized to provide a new MBMS. In this case, operation S100 may initialize channel setup information between layers, M2 interface setup information between the MBMS providing apparatus and the MCE, and M1 interface setup information between the MBMS providing apparatus and the MBMS-GW, and may update information on the MBSFN synchronization area for providing the MBMS and RRH information included in the MBSFN synchronization area for providing the MBMS.

Operation S101 is an operation in which the MBMS providing apparatus provides one M2 SETUP REQUEST message to the MCE, and the third layer may provide the one M2 SETUP REQUEST message to the MCE. Here, the M2 SETUP REQUEST message may include information on cells that receive broadcast information through the MBMS, and base station name information (i.e., MBMS providing apparatus name information).

Operation S102 is an operation in which the MBMS providing apparatus receives one M2 SETUP REQUEST RESPONSE message from the MCE in response to the M2 SETUP REQUEST message, and the third layer may receive the one M2 SETUP REQUEST RESPONSE message from the MCE. Here, the M2 SETUP REQUEST RESPONSE message may include BCCH setup information associated with MCCH, and MCE name information.

In this case, when the MCE does not receive the one M2 SETUP REQUEST message, the MCE may transmit one M2 SETUP FAILURE message to the MBMS providing apparatus, and the one M2 SETUP FAILURE message may include a standby time (time to wait) for message transmission.

When such operations are completed, M2 interface setup between the MBMS providing apparatus and the MCE is made, and thus, the M2 interface operates.

Operation S103 is an operation in which the MBMS providing apparatus receives one MCE CONFIGURATION UPDATE message from the MCE, and the third layer may receive the one MCE CONFIGURATION UPDATE message from the MCE. Here, the MCE CONFIGURATION UPDATE message may include global MCE ID information, MCE name information, BCCH setup data associated with MCCH of the MBMS providing apparatus that manages the cells included in the MBSFN synchronization area, and list information of the cells included in the MBSFN synchronization area.

In operation S104, a cell included in the MBSFN synchronization area and a cell for each layer are set. That is, in operation S104, a plurality of cells for providing the MBMS may be set on the basis of the list information of the cells included in the MBSFN synchronization area that has been provided in operation S103, and an MCCH and a BCCH may be set on the basis of the BCCH setup data associated with the MCCH. When the MCCH has been set, operation S104 may generate MCCH information for each MBSFN synchronization area, and the MCCH information may be periodically transmitted to a corresponding MBSFN synchronization area through the set MCCH.

Operation S105 is an operation in which, when MCE CONFIGURATION DATA has been successfully updated, the MBMS providing apparatus provides one MCE CONFIGURATION UPDATE ACKNOWLEDGE message to the MCE, and the third layer may provide the one MCE CONFIGURATION UPDATE ACKNOWLEDGE message to the MCE.

Operation S106 is an operation of setting MBMS information, and a control layer included in the third layer may set MBMS information of PHY, MAC, RLC, PDCP, and GTP layers. The MBMS information may include control parameter information of each layer for providing the MBMS. Subsequently, the control layer provides information associated with a system information block (SIB) (for example, SIB13) for MBMS to a DU for unicast, for setting MCCH information by MBSFN synchronization area. The DU for unicast may inform that a corresponding MBMS providing apparatus provides the MBMS through the SIB for MBMS.

Operation S107 is an operation in which the MBMS providing apparatus receives one MBMS SESSION START REQUEST message from the MCE, and the third layer may receive the one MBMS SESSION START REQUEST message from the MCE. Here, the one MBMS SESSION START REQUEST message may include MBMS SESSION IDEN- TITY information, and the MBMS providing apparatus may inform a terminal of MBMS SESSION information.

Operation S108 is an operation in which, when the MBMS providing apparatus receives the one MBMS SESSION START REQUEST message, the MBMS providing apparatus provides one MBMS SESSION START RESPONSE message to the MCE, and the third layer may provide the one MBMS SESSION START RESPONSE message to the MCE. In this case, when the MBMS providing apparatus cannot process the one MBMS SESSION START REQUEST message, the MBMS providing apparatus may provide one MBMS SESSION START FAILURE message to the MCE.

Operation S109 is an operation of setting an MBMS session for providing broadcast information, and the MBMS providing apparatus may provide one MULTICAST JOIN message to the MBMS-GW, and set the second layer and GTP for receiving the broadcast information. Subsequently, in operation S109, the start of a session in the MBSFN synchronization area may be notified of, in which case operation S109 may include notifying a terminal (which is included in the MBSFN synchronization area) of the start of the session on the basis of the MCCH, second layer, and first layer that have been set in operation S104.

Operation S110 is an operation in which the MBMS providing apparatus receives one piece of broadcast information from the MBMS-GW, and a data layer included in the third layer may receive the one piece of broadcast information from the MBMS-GW.

Operation S111 is an operation in which an RRH included in the MBSFN synchronization area is multicast/broadcast. That is, in operation S111 the broadcast information may be buffered according to the criterion of SYNC protocol, the buffered broadcast information may be scheduled, and the scheduled broadcast information may be multicast/broadcast through the RRH included in the MBSFN synchronization area, according to a corresponding time.

The present invention integrates the layers that perform the MBMS in the plurality of DUs, and performs the MBMS by MBSFN synchronization area through the integrated layers. Accordingly, the present invention can prevent the occurrence of an unnecessary load, thus enhancing the performance of a communication network.

While the example embodiments of the present invention and their advantages have been described in detail, it should be understood that various changes, substitutions and alterations may be made herein without departing from the scope of the invention.

What is claimed is:

1. A multimedia multicast and broadcast service (MBMS) providing apparatus including a plurality of digital units (DUs) that manage a plurality of cells included in a multimedia broadcast single frequency network (MBSFN) synchronization area, the MBMS providing apparatus comprising:
   a third layer into which a plurality of network layers providing an MBMS are integrated in the plurality of DUs; and
   a second layer into which a plurality of datalink layers providing the MBMS are integrated in the DUs.

2. The MBMS providing apparatus of claim 1, wherein the third layer comprises:
   a control layer configured to process control information for the MBMS; and
   a data layer configured to process broadcast information for the MBMS.

3. The MBMS providing apparatus of claim 1, further comprising a first layer configured to integrate a plurality of physical layers providing the MBMS in the DUs.

4. The MBMS providing apparatus of claim 3, wherein a MBMS circuit of the MBMS providing apparatus sets a control parameter for providing the MBMS to the cells included in the MBSFN synchronization area on the basis of one piece of M2 application protocol (M2AP) information, the M2 denoting a control plane interface inside a radio access network.

5. The MBMS providing apparatus of claim 4, wherein the M2AP information comprises at least one of one piece of MBMS session information, one piece of MBMS scheduling information, one piece of reset information, one piece of M2 setup information, one piece of base station setup information, one piece of multicell and multicast coordination entity (MCE) setup information, one piece of error indication information, one piece of MBMS session update information, and one piece of MBMS counting information that are used to provide the MBMS to the cells included in the MBSFN synchronization area.

6. The MBMS providing apparatus of claim 3, wherein a MBMS circuit of the MBMS providing apparatus provides one piece of broadcast information to the cells included in the MBSFN synchronization area.

7. A multimedia multicast and broadcast service (MBMS) providing method in an MBMS providing apparatus including a plurality of digital units (DUs) that manage a plurality of cells included in a multimedia broadcast single frequency network (MBSFN) synchronization area, the MBMS providing method comprising:
   setting a control parameter for providing the MBMS on the basis of one piece of M2 application protocol (M2AP) information for an MBMS layer into which a plurality of layers providing the MBMS are integrated in the DUs, the M2 denoting a control plane interface inside a radio access network; and
   providing one piece of broadcast information to the cells included in the MBSFN synchronization area through the MBMS layer.

8. The MBMS providing method of claim 7, wherein the setting of a control parameter comprises:
   initializing information of the MBMS layer;
   providing one piece of M2 setup request information for the MBMS layer to a multicell and multicast coordination entity (MCE);
   setting an M2 interface according to the one piece of M2 setup request information, and setting a channel for the MBMS layer and the MCE on the basis of one piece of MCE setup update information;
   providing one piece of MCE setup update check information that is a response to the one piece of MCE setup update information;
   setting a plurality of layers for providing the MBMS;
   providing one piece of MBMS session response information to the MCE according to one piece of MBMS session start request information; and
   setting a session for providing broadcast information on the basis of the one piece of MBMS session start request information.

9. A multimedia multicast and broadcast service (MBMS) providing method in a communication network, which includes: an MBMS providing apparatus including a plurality of digital units (DUs) that manage a plurality of cells included in a multimedia broadcast single frequency network (MBSFN) synchronization area; a multicell and multicast coordination entity (MCE); and an MBMS gateway (MBMS-GW), the MBMS providing method comprising:

initializing, by the MBMS providing apparatus, information for an MBMS layer into which a plurality of layers providing the MBMS are integrated in the DUs;

providing, by the MBMS providing apparatus, one piece of M2 setup request information for the MBMS layer to the MCE, the M2 denoting a control plane interface inside a radio access network; and providing, by the MCE, one piece of M2 setup response information to the MBMS providing apparatus, the M2 setup response information being a response to the one piece of M2 setup request information.

10. The MBMS providing method of claim 9, further comprising:

setting an M2 interface according to the one piece of M2 setup response information, and providing, by the MCE, one piece of MCE setup update information for the MBMS layer to the MBMS providing apparatus;

setting, by the MBMS providing apparatus, a channel for the MBMS layer and the MCE on the basis of the one piece of MCE setup update information;

providing, by the MBMS providing apparatus, one piece of MCE setup update check information to the MCE, the MCE setup update check information being a response to the one piece of MCE setup update information; and setting, by the MBMS providing apparatus, an MBMS layer for providing the MBMS.

11. The MBMS providing method of claim 10, further comprising:

providing, by the MCE, one piece of MBMS session start request information for the MBMS layer to the MBMS providing apparatus after the MBMS layer for providing the MBMS is set;

providing, by the MBMS providing apparatus, one piece of MBMS session start response information to the MCE, the MBMS session start response information being a response to the one piece of MBMS session start request information; and setting, by the MBMS providing apparatus, a session for providing broadcast information on the basis of the MBMS session start request information.

12. The MBMS providing method of claim 11, further comprising:

providing, by the MBMS-GW, one piece of broadcast information for the MBMS layer to the MBMS providing apparatus after the session for providing the broadcast information is set; and providing, by the MBMS providing apparatus, the one piece of broadcast information to the cells included in the MBSFN synchronization area through the MBMS layer.

* * * * *